United States Patent

[11] 3,596,455

| [72] | Inventor | Philip R. Adrian |
| | | Escalon, Calif. |
| [21] | Appl. No. | 820,717 |
| [22] | Filed | May 1, 1969 |
| [45] | Patented | Aug. 3, 1971 |
| [73] | Assignee | Fruit Harvesting Co., Inc. |
| | | Escalon, Calif. |

[54] FRUIT-HARVESTER
9 Claims, 26 Drawing Figs.

[52] U.S. Cl. .................................................. 56/329
[51] Int. Cl. ................................................ A01g 19/06
[50] Field of Search ......................................... 56/329;
209/99, 107; 193/7

[56] References Cited
UNITED STATES PATENTS

| 478,903 | 7/1892 | Ball | | 56/329 |
| 1,626,068 | 4/1927 | Bartlett | | 56/329 X |
| 2,714,281 | 8/1955 | Steele | | 56/329 |
| 3,105,346 | 10/1963 | Stanclift | | 56/329 |
| 3,250,065 | 5/1966 | Frost | | 56/329 |
| 3,347,368 | 10/1967 | Mogensen | | 209/99 |
| 3,407,582 | 10/1968 | Poehlmann | | 56/329 |
| 3,448,847 | 6/1969 | Csimma | | 193/7 X |
| 3,474,609 | 10/1969 | Alberti et al. | | 56/329 |
| 3,505,801 | 4/1970 | Nye | | 56/329 |

FOREIGN PATENTS

| 769,376 | 10/1967 | Canada | 56/329 |
| 259,926 | 2/1968 | Germany | 56/329 |
| 1,423,073 | 11/1965 | France | 56/329 |
| 436,826 | 11/1967 | Switzerland | 56/329 |
| 180,914 | 3/1966 | U.S.S.R. | 56/329 |

*Primary Examiner*—Louis G. Mancene
*Assistant Examiner*—J. A. Oliff
*Attorney*—Mellin, Moore & Weissenberger

ABSTRACT: A device for harvesting fruit or the like from a tree, the device including a pair of conveyors disposed on either side of the trunk of the tree, sheet means downwardly sloping from the trunk of the tree toward the conveyors to feed fruit falling thereon toward the conveyors, and a sheet of generally bowllike configuration, the sheet being made up of two sheet portions to feed fruit falling thereon toward the conveyors. The sheet portions are retractable so that they may be folded up. Longitudinal resilient members, in spaced-apart, staggered relationship, are positioned to receive fruit fed toward the conveyor and limit the acceleration of the fruit, meanwhile allowing it to fall therethrough and to the conveyors without damage.

FIG_4

FIG_5

FIG_6

INVENTOR
PHILIP R. ADRIAN

BY

Mellin, Moore & Weissenberger

ATTORNEYS

FIG_19

FIG_20

FIG_14

FIG_15

INVENTOR.
PHILIP R. ADRIAN
BY
Mellin, Moore & Weissenberger
ATTORNEYS

FIG_16

FIG_17

FIG_18

FIG_21

FIG_22

FIG_23

FIG_24

FIG_25

3,596,455

FRUIT-HARVESTER

BACKGROUND OF THE INVENTION

This invention relates to apparatus for harvesting fruit or the like, and more particularly, to such an apparatus which is a single unit being capable of convenient movement from tree to tree during the harvesting operation.

With the recent great increases in the cost of farm labor, it has become more and more necessary to provide apparatus which is capable of properly harvesting fruit or the like from trees in an orchard.

Apparatus for harvesting such fruit should, of course, fill certain requirements. First, the apparatus should include means capable of effectively removing substantially all the fruit from the trees without damage to either the fruit or the trees. Second, substantially all of the fruit falling from the trees should be received by the apparatus. Third, and quite important, the fruit must not be bruised or damaged as it is collected or received by the apparatus. Fourth, the apparatus must include means for conveying the fruit in such a manner as to avoid damage thereto, so that it can be gathered. Fifth, the apparatus should be easily and conveniently movable from tree to tree, and should harvest the fruit thereon relatively rapidly. Sixth, the entire apparatus should be as simple and maintenance-free as possible.

Generally, in the prior art, adequate protection has not been included for the falling fruit. Furthermore, the known devices generally comprise two separate portions, one for either side of the tree, which must be moved separately into position for harvesting.

It is an object of this invention to provide a harvesting apparatus which is capable of harvesting fruit or the like from a tree effectively, and without damage to either the fruit or the tree.

It is a further object of this invention to provide a harvesting apparatus which, while fulfilling the above object, is of generally a single unit capable of being moved from tree to tree in a simple and convenient manner by one operator.

It is a still further object of this invention to provide a harvesting apparatus which, while fulfilling the above objects, is extremely simple and maintenance-free in construction and operation.

SUMMARY OF THE INVENTION

Broadly stated, the inventive apparatus for harvesting fruit or the like from a tree comprises a frame, and a pair of generally parallel conveyors fixed to the frame and disposed on either side of the trunk of the tree. Included are resilient sheet means sloping downwardly from the trunk of the tree on either side thereof to near the sides of the conveyors adjacent the trunk. A resilient sheet is associated with the frame and extends generally about the trunk from near the sides of the conveyor removed from the trunk in taut, generally bowllike configuration, the sheet means and sheet being configured to feed fruit falling thereon downwardly onto the conveyor. The resilient sheet is extendable to its bowllike configuration and retractable so that it folds up. Pluralities of resilient longitudinal members in generally parallel, spaced-apart and staggered relationship receive fruit from the resilient sheet and resilient sheet means and limit the acceleration of the fruit as it falls onto the conveyors.

BRIEF DESCRIPTION OF THE DRAWINGS

These and other objects of the invention will become apparent from a study of the following specification and drawings, in which.

DESCRIPTION OF THE PREFERRED EMBODIMENT

Shown generally in FIGS. 1—6 is the inventive fruit-harvesting apparatus 30. Apparatus 30 includes a vehicle 32 which is driven by controls 34. Vehicle 32 has fixed thereto and extending therefrom frame portion 36. Connected to frame portion 36 by means best shown in FIGS. 16—19 is another frame portion made up of sides 40 and 42 parallel to each other.

Extending from opposite sides of frame portion 36 are members 46, 48. The forward portion 40A of side 40 is pivotally mounted to member 46, and the forward portion 42A of side 42 is pivotally mounted to member 48. The rearward portion 40B of side 40 is fixed at one end to member 46 and at its other end relative to vehicle 32 by means not shown. The rearward portion 42B of side 42, similarly, has one end fixed to member 48 and the other end fixed relative to vehicle 32 by means not shown.

Extending under frame portion 36 and pivotally fixed thereto about its longitudinal axis through brackets 50, 52 is a tube 54. Tube 54 extends under side 40 and side 42. Fixed to tube 54 are rigid extension plates 56, 58, 60, 62, 64, 66. A shaft 68 is pivotally fixed relative to frame portion 36 (FIGS. 18 and 19) and has fixed thereto rigid extension plates 70, 72, 74. A hydraulic cylinder 76 interconnects frame portion 36 and the end of extension plate 72, and, when actuated, pivots shaft 68 about its longitudinal axis.

Figure 16:
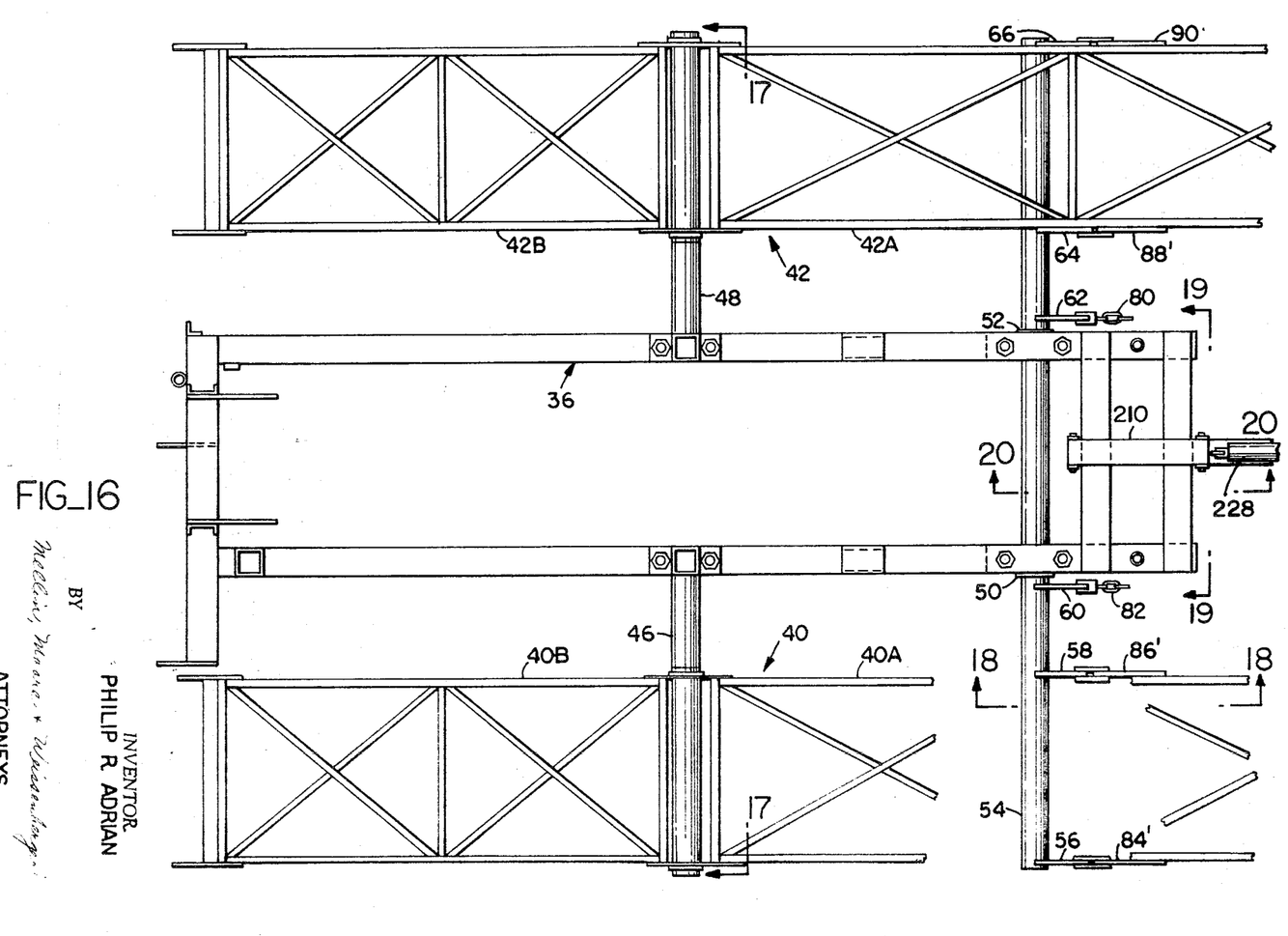
FIG. 16 is a plan view of the frame of the apparatus, showing the conveyors associated therewith.
Figure 17:
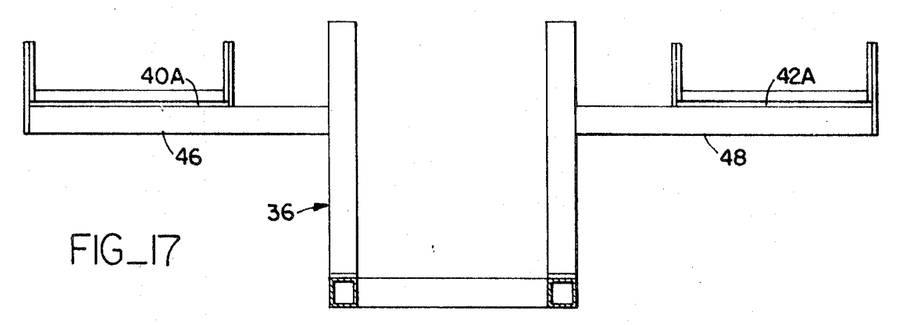
FIG. 17 is a sectional view taken along the line 17—17 of FIG. 16.
Figure 18:
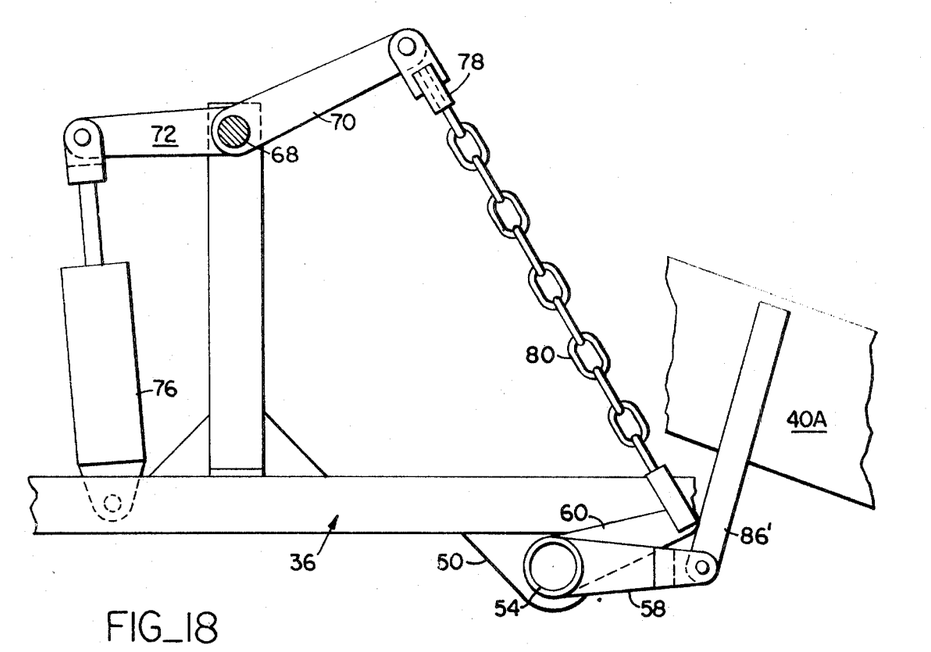
FIG. 18 is a sectional view taken along the line 18—18 of FIG. 16.
Figure 19:
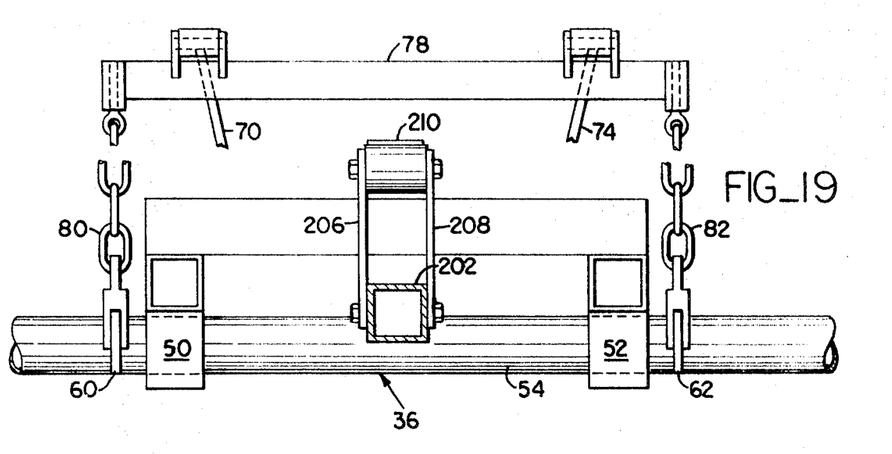
FIG. 19 is a sectional view taken along the line 19—19 of FIG. 16.
Figure 20:
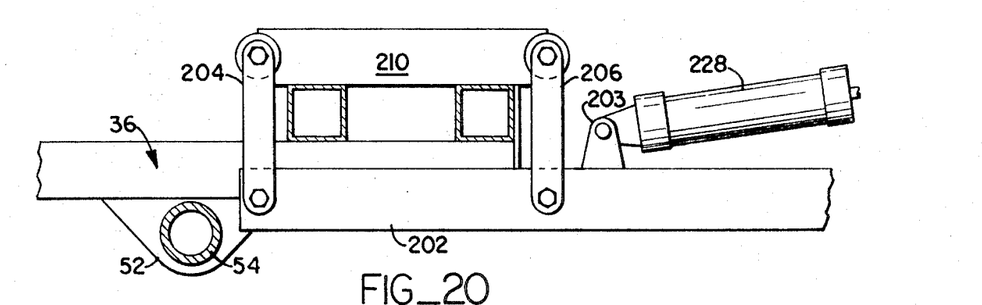
FIG. 20 is a sectional view taken along the line 20—20 of FIG. 16.
Figure 21:
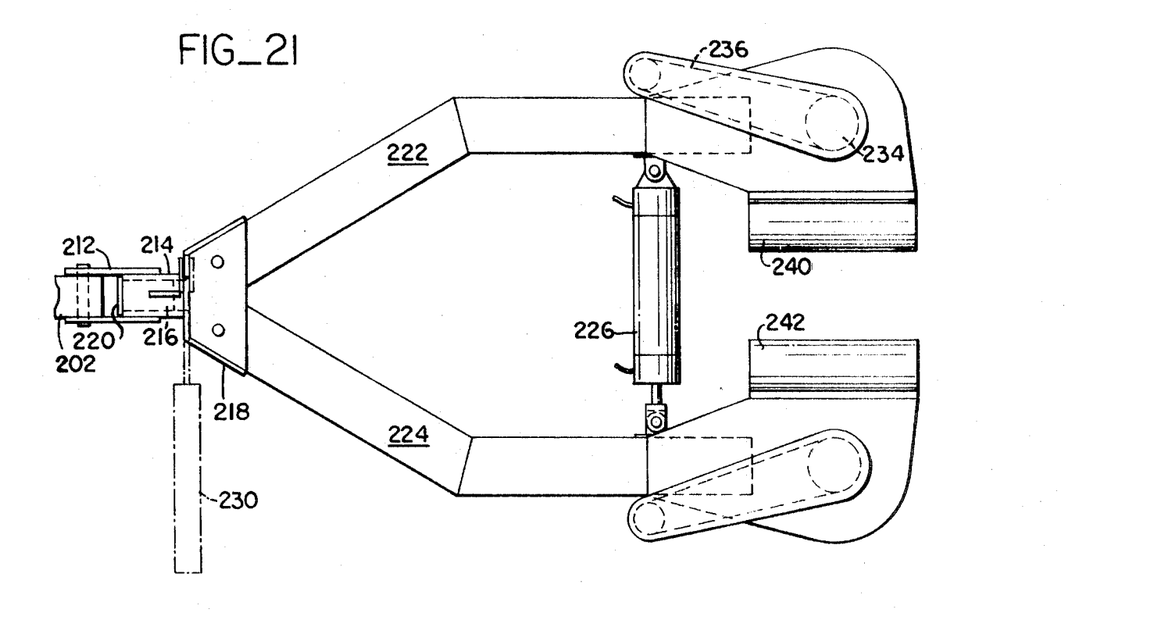
FIG. 21 is a plan view of the shaker of the apparatus.
Figure 22:
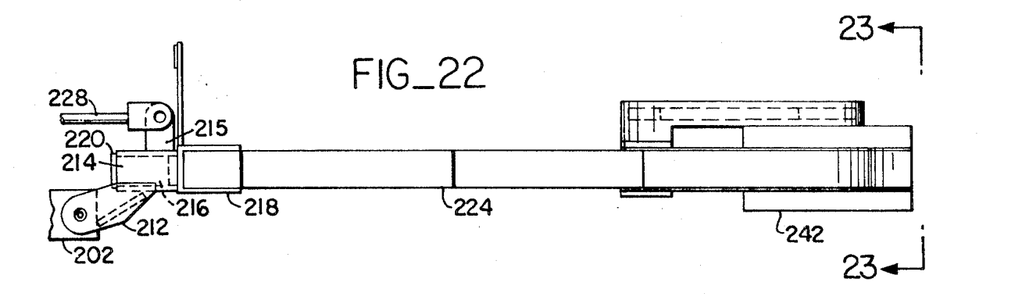
FIG. 22 is a side elevation of the shaker of FIG. 21.
Figure 23:
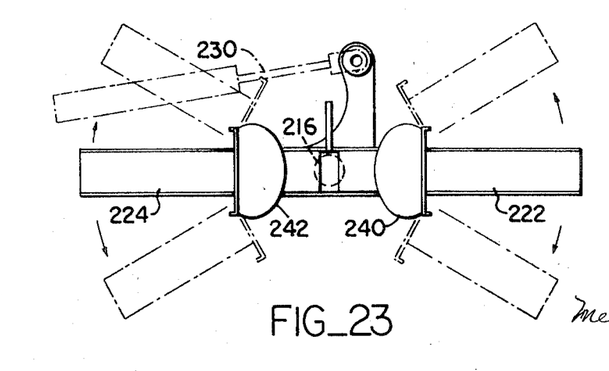
FIG. 23 is a front elevation of the shaker of FIGS. 21 and 22.

Pivotally supported by the ends of extension plates 70, 74 is a crossbar 78. A chain 80 interconnects one end of crossbar 78 and the end of extension plate 60, and a chain 82 interconnects the other end of crossbar 78 and the end of extension plates 62. Linkage bars 84', 86' are pivotally fixed to the ends of extension plates 56, 58 respectively, and to forward portion 40A of side 40. Linkage bars 88', 90' are pivotally fixed to the ends of extension plates 64, 66 and to forward portion 42A of side 42 (FIGS. 16 and 18). It will be seen, as best shown in FIG. 18, that forward portions 40A, 42A may be raised by actuation of cylinder 76, the chains 80, 82 pulling on extension plates 60, 62 to pivot tube 54, to in turn pivot forward portions 40A, 42A about members 46, 48. The forward portions 40A, 42A may be lowered by deactuating cylinder 76, allowing forward portions 40A, 42A to pivot downward under their own weight about members 46, 48.

Figure 1:
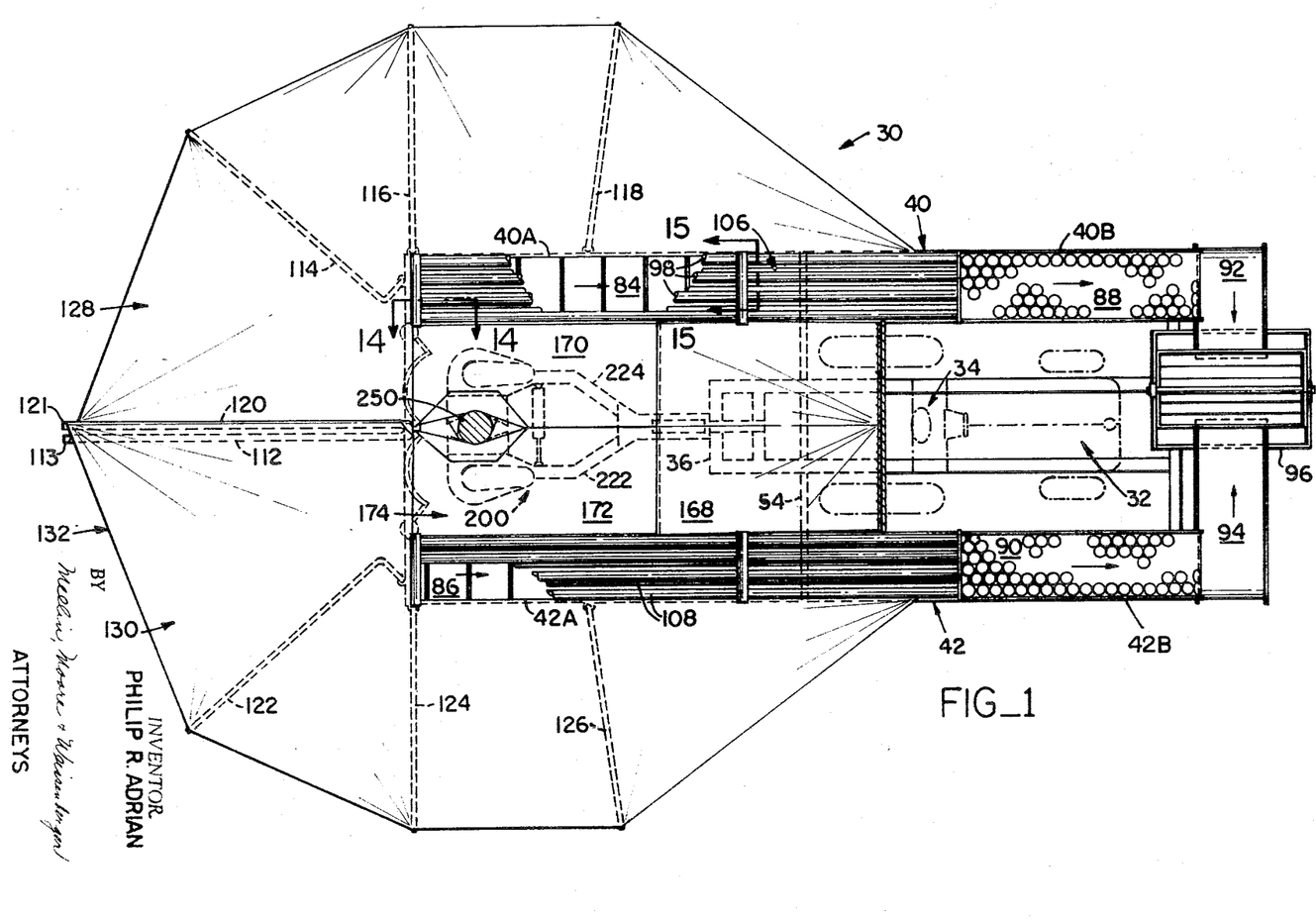
FIG. 1 is a plan view of the inventive structure, with the sheets extended.

As best shown in FIG. 1 forward portions 40A, 42A support conveyors 84, 86 which are positioned to feed fruit thereon rearwardly and onto sizing conveyors 88, 90, which are supported by rearward portions 40B, 42B. Sizing conveyors 88, 90 are positioned to feed onto lateral conveyors 92, 94, which in turn feed into bin 96, which collects the fruit.

Figure 14:
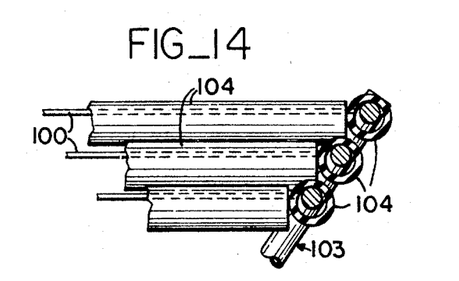
FIG. 14 is a sectional view taken along the line 14—14 of FIG. 1.
Figure 15:
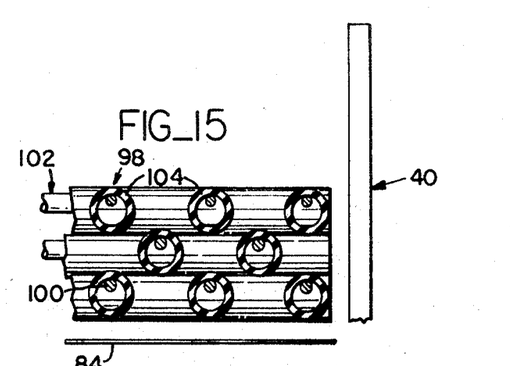
FIG. 15 is a sectional view taken along the line 15—15 of FIG. 1.

Disposed over and along the conveyor 84 are a plurality of resilient, longitudinal members 98. The longitudinal members 98 are in generally parallel, spaced-apart, staggered relationship, as shown in FIGS. 14 and 15. Each longitudinal member 98 is made up of a longitudinal, elastic extensible member 100 supported at its ends by subframes (such as subframes 102 and 103) fixed to side 40. A longitudinal resilient tubular member 104 is disposed about and supported by each extensible member 100, and each extensible member 100 extends from one end of the tubular member 104 to the other end. In proper places, tubular members 104 can be used to pad the subframes, such as subframes 102 and 103 (FIGS. 14 and 15).

Such longitudinal members together comprise receiving means 106. Disposed over and along conveyor 86 are a similar plurality of longitudinal members 108, which together comprise receiving means 110. The operation and utility of these receiving means 106, 110 will be described in detail further on.

Figure 2:
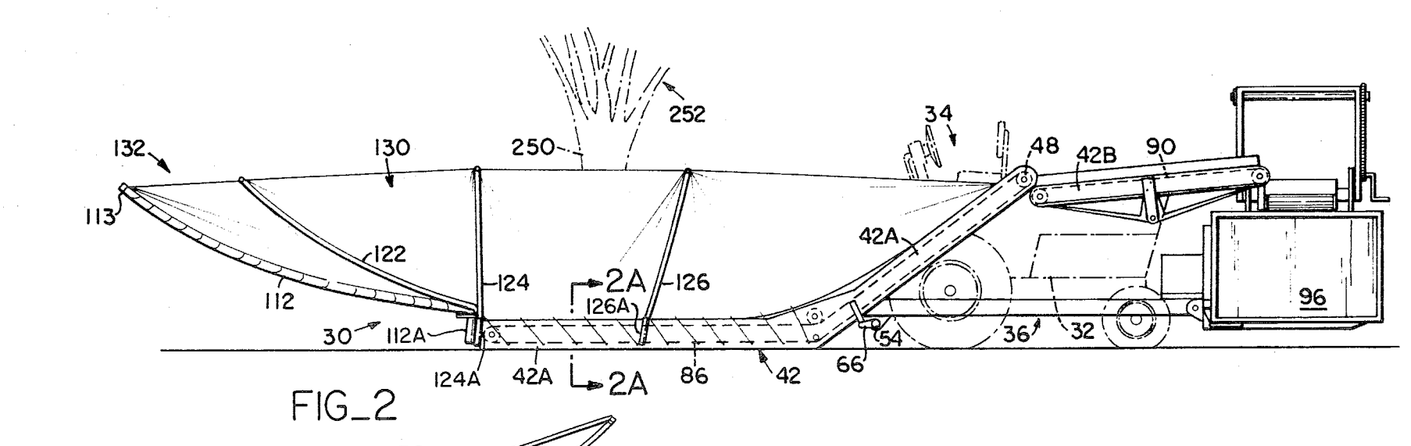
FIG. 2 is a side elevation of the inventive structure as shown in FIG. 1.
Figures 2A, 3:
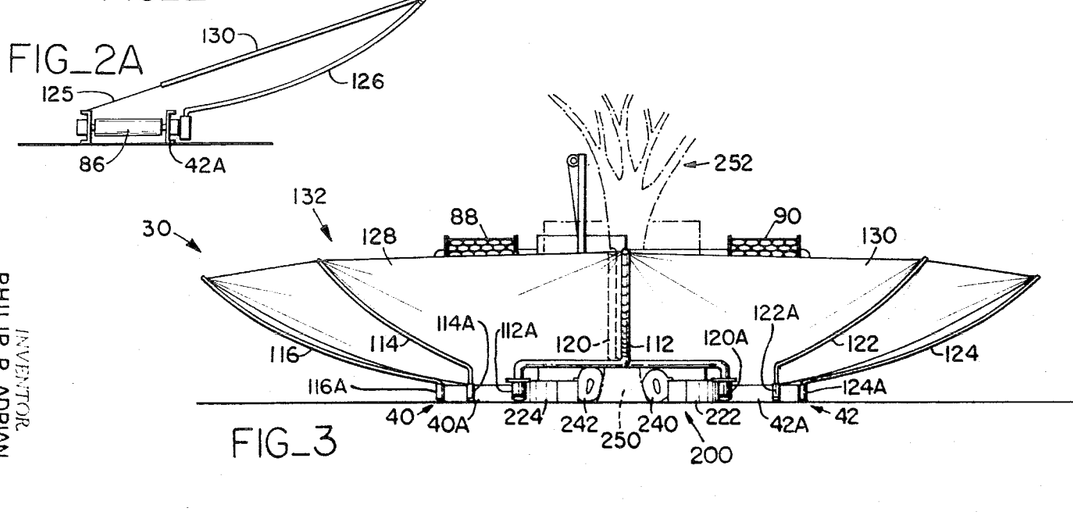
FIG. 2A is a sectional view taken along the line 2A—2A of FIG. 2.
FIG. 3 is a front elevation of the inventive structure, as shown in FIGS. 1 and 2.
Figure 4:
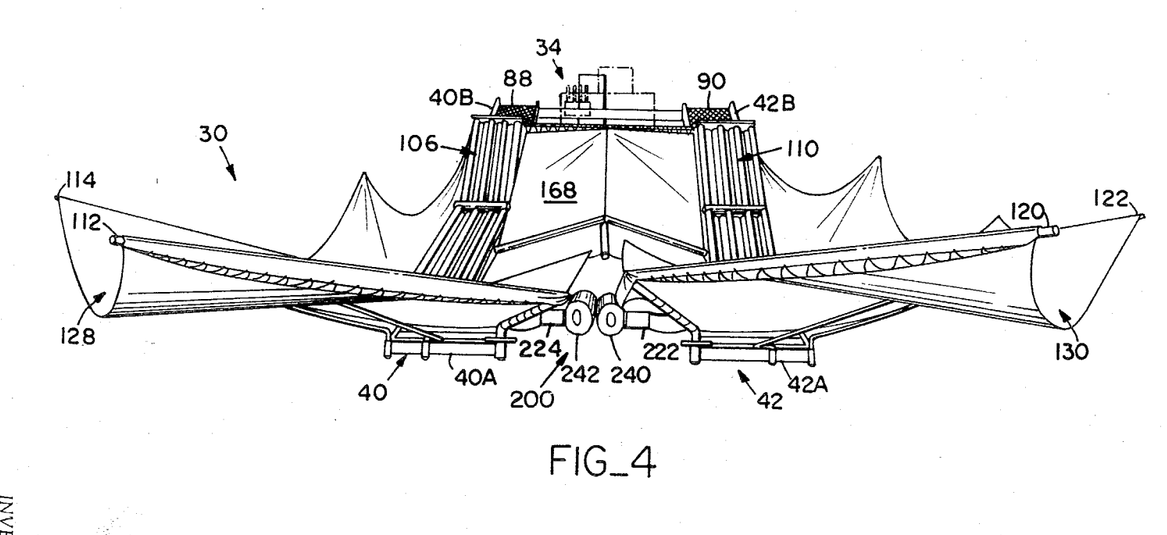
FIG. 4 is a front perspective view of the inventive structure, with the sheets partially retracted.
Figure 5:
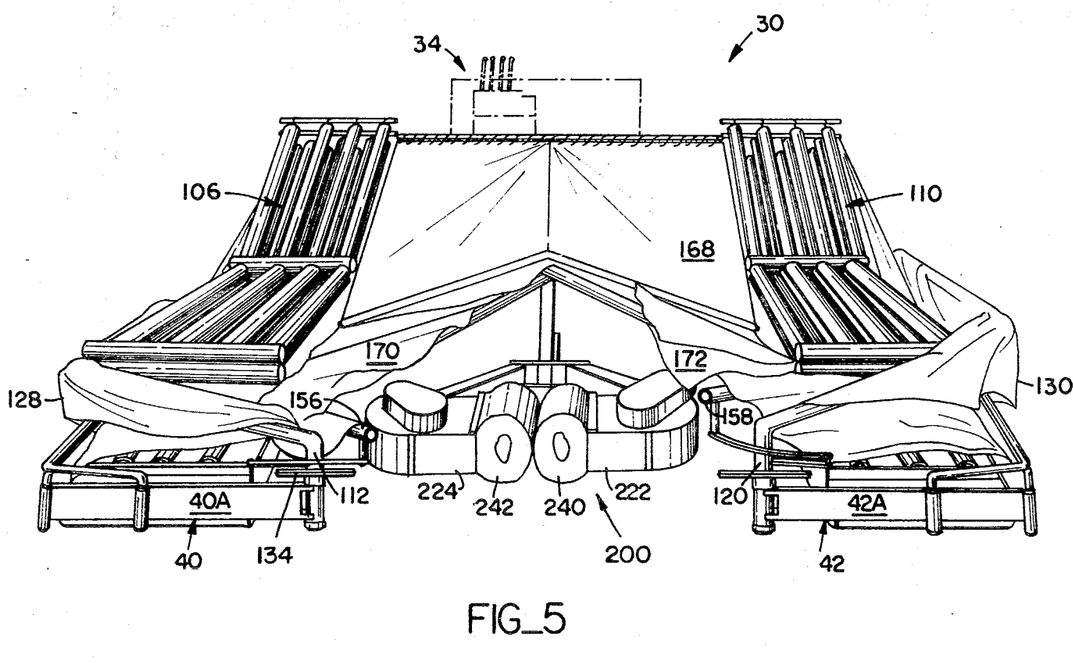
FIG. 5 is a view similar to FIG. 4 but with the sheets fully retracted.

As shown in FIGS. 1-6, side 40 has pivotally mounted thereto and extending therefrom arms 112, 114, 116, 118. Side 42 has pivotally mounted thereto and extending therefrom arms 120, 122, 124, 126. Thus, arms 112, 114, 116 and 118 and arms 120, 122, 124 and 126, as can be seen in FIGS. 2 and 3, are pivotally attached to sides 40 and 42 by means of having their respective end portions pivotally mounted in sleeves 112A, 114A, 116A, 118A, 120A, 122A, 124A and 126A (118A not being visible in the drawing) secured by any suitable means to the respective sides 40 and 42. A first canvas sheet portion 128 extends from forward frame portion 40A, from near the outside of conveyor 84 and near the receiving means 106. The extended ends of the arms 114, 116, 118 are fixed to the outer edge of the sheet portion 128. The arm 112 is padded with resilient tubing 113 along its length, and is attached along its length to sheet portion 128. A second canvas sheet portion 130 extends from forward frame portion 42A from near the outside of conveyor 86 near the receiving means 110. The extended ends of arms 122, 124, 126 are fixed to the outer edge of the sheet portion 130. The arm 120 is padded with resilient tubing 121 along its length and is attached along its length to sheet portion 130. It will be seen that the arms 112—118 are pivotal relative to the side 40 to extend the first sheet portion 128, and pivotal relative to the side 40 to retract the first sheet portion 128. Similarly the arms 120—126 are pivotal relative to the side 42 to extend the second sheet portion, and pivotal relative to the side 42 to retract the second sheet portion 130. Such positions of extension and retraction are shown in FIGS. 1 and 5.

Such sheet portions 128, 130 together form a sheet 132 which, when the sheet portions 128, 130 are extended and taut, is of generally bowllike configuration, as shown in FIGS. 2 and 3, with arms 112, 120 overlapping.

As shown in FIG. 2A, the inner edge of sheet portion 130 is suspended in spaced relation to conveyor 86. The means for providing such spacing comprise a plurality of taut, elastic members, one of which (125) is shown in FIG. 2A. Member 125 is fixed to the frame portion 42A and extends upwardly therefrom over conveyor 86 to the inner edge of the sheet portion 130. Together, the plurality of taut elastic members interconnect the inner edge of sheet portion 130, as, for example, at point of attachment 130A with the frame portion 40A, so that the inner edges of the sheet 132 are resiliently suspended above the frame and conveyors. Such suspension has been found to reduce pocketing of fruit at the edges of the conveyors 84, 86, which would be a great problem if such suspension were not provided.

The means for extending and retracting sheet portions 128, 130 are shown in FIGS. 7—11. Arm 112 has fixed thereto and pivotal therewith a sheave 134. A hydraulic cylinder 136 has its connecting rod 138 pivotally fixed to side 40 of frame 38, and its body 140 slidably disposed within a guide 142 fixed to side 40. A flexible cable 144 has one end clamped to the body 140 of cylinder 136 by means of clamp 146, the said cable extending around a pulley 148, sheave 134, pulley 150, and pulley 152. The other end of cable 144 is clamped to said body 140 by means of clamp 146. It will be seen that, by stroking cylinder 136 back and forth, the sheave 134 rotates back and forth, in turn pivoting arm 112 back and forth. Means (not shown) are included for selectively stroking cylinders 136. It is the pivoting of arm 112 back and forth which extends and retracts sheet portions 128. Similar means are associated with side 42 for extending and retracting the sheet portion 130. Since the appropriate sheet portions 128 and 130 are secured to both sets of arms 112, 114, 116, 118 and arms 120, 122, 126, respectively, driving motion imparted to arms 112 and 120 is also imparted to arms 114, 116, 118, and arms 122, 124, 126, respectively, by means of the attached sheet portion.

Figure 6:
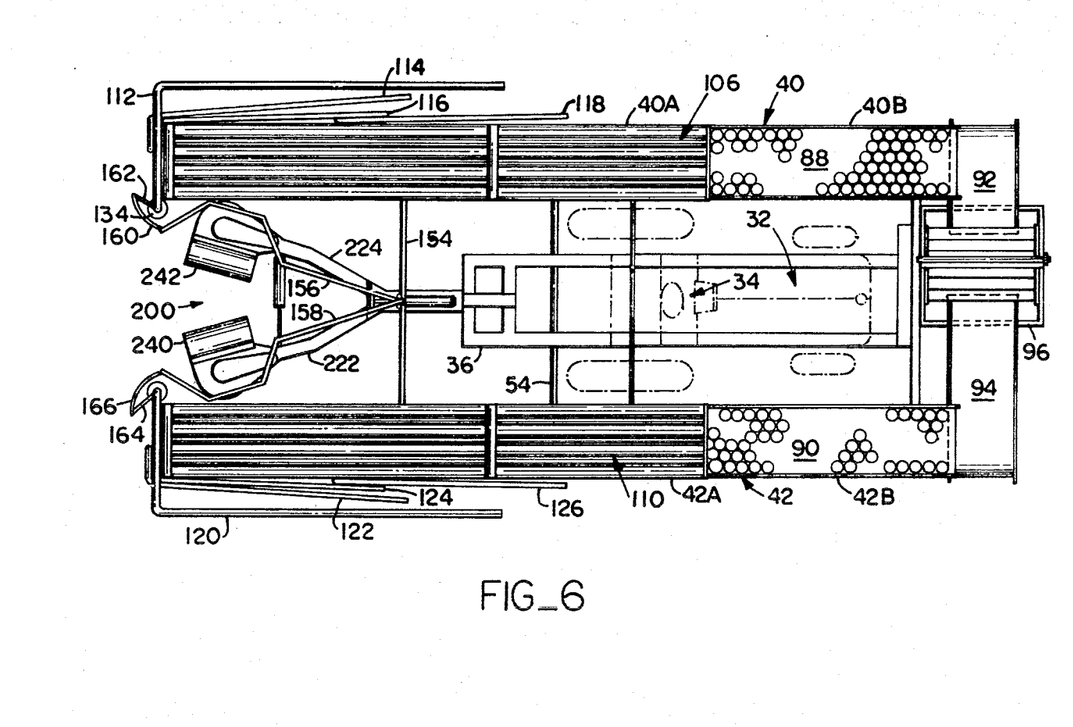
FIG. 6 is a plan view of the structure, with the sheets removed.
Figure 7:
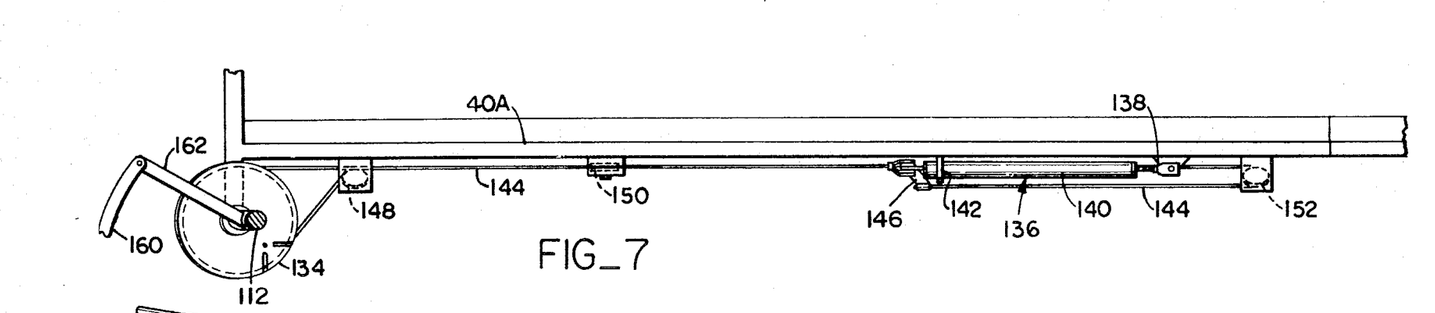
FIG. 7 is a plan view of the drive means for extending and retracting the sheets.
Figure 8:
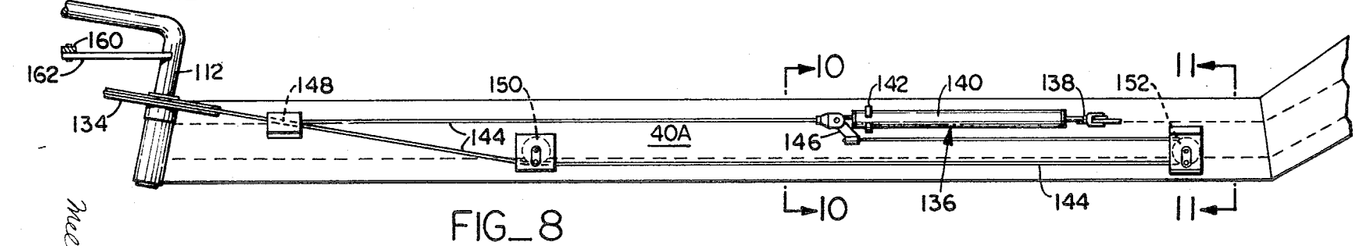
FIG. 8 is a side elevation of the drive means of FIG. 7.
Figure 9:
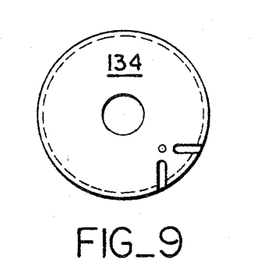
FIG. 9 is a plan view of the drive wheel of the means of FIGS. 7 and 8.
Figure 10:
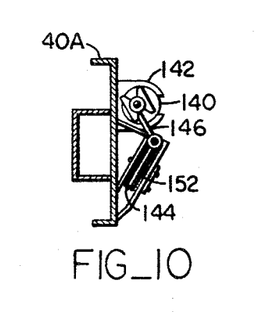
FIG. 10 is a sectional view taken along the line 10—10 of FIG. 8.
Figure 11:
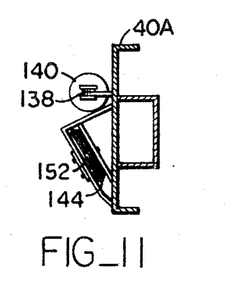
FIG. 11 is a sectional view taken along the line 11—11 of FIG. 8.
Figure 12:
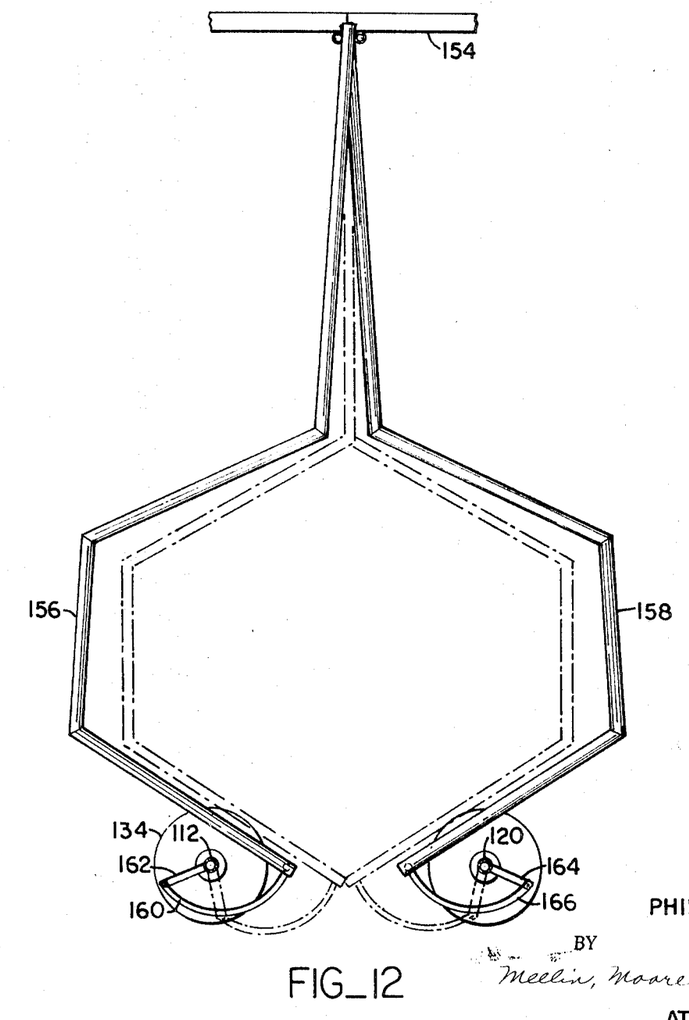
FIG. 12 is a plan view of the linkage bar system used for extending and retracting the inner sheet means.
Figure 13:
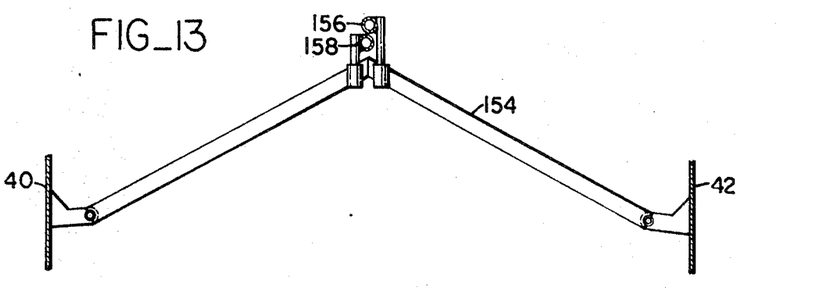
FIG. 13 is a front elevation of a portion of the support means of the linkage bar system of FIG. 12.

As shown in FIGS. 6 and 13, a crossmember 154 extends between and has its ends hingedly fixed to sides 40, 42. A pair of arms 156, 158, the shapes of which are best shown in FIGS. 6 and 12, are disposed between sides 40, 42. One end of arm 156 is pivotally fixed to crossmember 154 and the corresponding end of arm 158 is also pivotally fixed to crossmember 154 adjacent the one end of arm 156. The other end of arm 156 has pivotally fixed thereto one end of a curved link 160. The other end of the curved link 160 is pivotally fixed to a radial bar 162 which is in turn fixed to arm 112. A radial bar 164 and curved link 166 are associated in a similar manner with the corresponding end of arm 158 and with arm 120. Rotation of sheave 134, and the similar sheave associated with arm 120, back and forth, draws the arms 156, 158 together and separates them, as shown in FIG. 12. Such arms 156, 158 act, in effect, as a pair of jaws which may be opened and closed. It should be noted that the drive means previously described for extending and withdrawing the sheet portions 128, 130 acts to open and close the jaws defined by arms 156, 158, since these arms 156, 158 act through linkages off arms 112, 120.

Rearwardly of the arms 156, 158, resilient sheet means 168 are disposed between and extend downwardly to the receiving means 106, 110. Such resilient sheet means 168 may preferably be of canvas. Arms 156, 158 are padded with resilient tubing. Extending from the receiving means 106 and fixed to the arm 156 is a resilient sheet portion 170 (FIG. 5). Extending from the receiving means 110 and fixed to the arm 158 is a resilient sheet portion 172. Both sheet portions 170, 172 may with advantage be of canvas, and form together front sheet means 174 (FIG. 1). Sheet portions 170, 172, it will be seen, extend and retract with arms 156, 158.

Shaker means 200 for inducing fruit to fall from a tree are shown in FIGS. 19—25. A body portion 202 of shaker means 200 is hung by means of pivoting links, as 204, 206, 208 which are fixed to a horizontal member 210 of frame 36. Pivotally fixed to body portion 202 is a bracket 212 which can be pivoted upwardly and downwardly relative thereto.

Such bracket 212 has fixed thereto a tube 214, into which rotatably fits a pin 216 fixed to a second bracket 218. Such pin 216 is held from release within the tube 214 by means of an end cap 220 fixed to pin 216. Pivotally fixed to bracket 218 are arms 222, 224 between conveyors 84, 86 which are openable and closeable, much as in the manner of jaws. A hydraulic cylinder 226 interconnects the arms 222, 224 and is used to achieve such jawlike movement. The arms 222, 224 can be together raised and lowered, by means of a hydraulic cylinder 228 (FIGS. 20 and 22) which interconnects flange 215 on tube 214 and flange 203 on body 202. The pin-216-and-tube-214 mounting allows swiveling of the arms 222, 224 together in the manner shown in FIG. 23. A hydraulic cylinder, such as shown at 230 in phantom, may be used to provide such swiveling.

Figure 24:
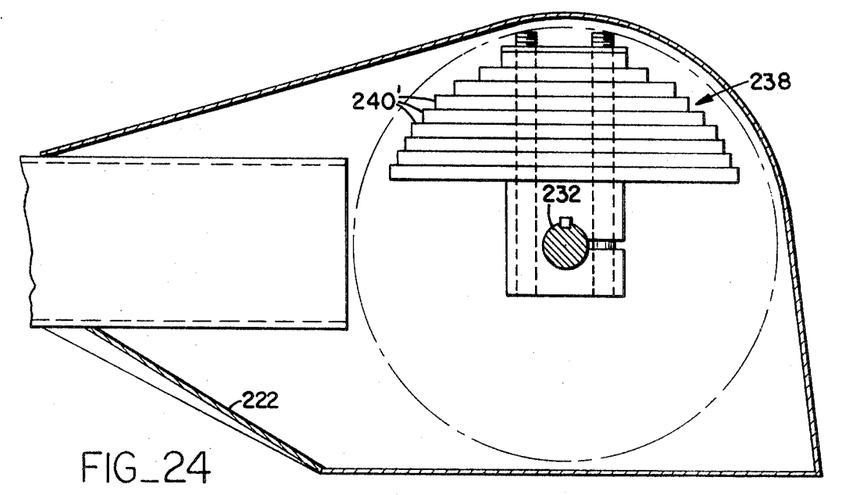
FIG. 24 is a sectional plan view of a portion of an arm of the shaker.
Figure 25:
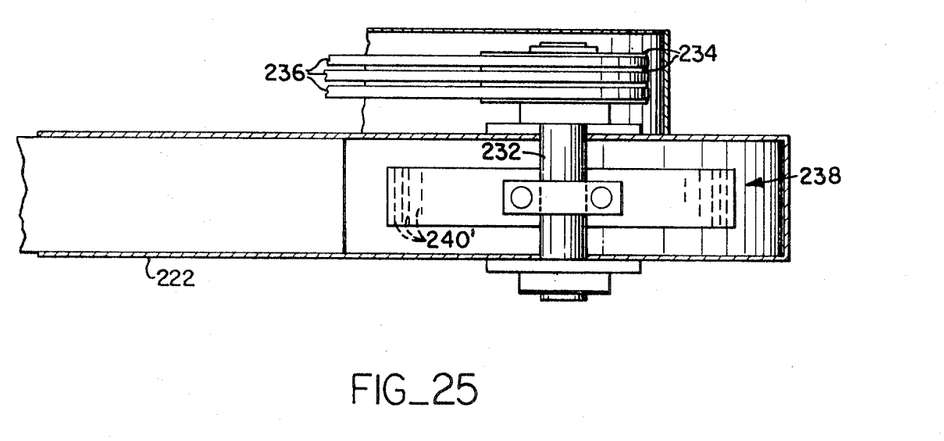
FIG. 25 is a sectional side elevation of the portion of the arm of the shaker, as shown in FIG. 24.

As shown in FIGS. 24 and 25, arm 222 has fixed rotatably therewithin a vertical shaft 232, rotated by means of pulleys 234 fixed to shaft 232, belts 236, and a hydraulic motor (not shown). Fixed to the shaft 232 is an eccentric weight 238, made up of removable and replaceable stacked plates 240' of varying weight. It will be seen that rotation of shaft 232 acts to vibrate or shake arm 222 back and forth, the extent of shaking depending on the size and number of plates 240' and the rate of rotation of shaft 232. Arm 224 has associated therewith similar shaking means. Arms 222, 224 have fixed to their ends resilient rolls 240, 242, adapted to grip the trunk of a tree therebetween when the arms 222, 224 are drawn together.

In the operation of the invention, apparatus 30 is driven up to a tree by means of vehicle 32 with the arms 222, 224 apart and the sheet portions 128, 130 in their fully retracted positions. The arms 156, 158 and sheet portions 170, 172 are retracted also. With the arms 222, 224 and arms 156, 158 open, the apparatus may be driven to a point where the trunk of a tree is between resilient rolls 240, 242, and the conveyors 84, 86 are disposed on either side of the trunk of the tree. The arms 222, 224 may either be raised or lowered by cylinder 228, to put them at proper height. Cylinder 226 is then actuated to draw arms 222, 224 together so that the trunk 250 of the tree 252 is gripped between resilient rolls 240, 242 (FIGS. 1—3). The arms 222, 224 then rotate about the axis of pin 216, to set them at the proper angle in case the trunk of the tree is at an angle. Cylinder 136, and a like cylinder associated with sheet portion 130, are then actuated to extend sheet portions 128, 130 to form sheet 132, which is disposed about the trunk 250 of the tree 252 in generally bowllike configuration (FIGS. 1—3). Such extension of sheet portions 128, 130, acts to draw arms 156, 158 together, extending sheet portions 170, 172 into sheet means 174 which slopes downwardly from the trunk 250 of the tree 252 on either side thereof. Conveyors 84, 86, 88, 90, 92, 94 are started.

The hydraulic motors associated with arms 222, 224 are then actuated so that shaking of the tree 252 commences. The hydraulic motors are adapted to have the eccentric weight of one arm rotate at a rate somewhat faster than the other arm. This rotation results in a resultant force being applied to the tree which is continually changing. The changing resultant force, when applied to the tree 252, causes fruit to properly and efficiently fall from the tree 252.

Some of the fruit falls onto sheet 132. The fruit falling thereon will not be damaged, because of the resiliency thereof, and because of its bowllike configuration will be fed downwardly to the receiving means 106, 110. The resilient longitudinal members 98 of receiving means 106, being staggered, allow the fruit to fall therethrough through the openings between them, meanwhile limiting the acceleration of the fruit falling therethrough. Such fruit thus falls on the conveyor 84 at a relatively low velocity, and will not be damaged or bruised in the fall. Receiving means 110, of course, allow fruit to fall onto conveyor 86 in a similar manner.

Fruit falling on sheet means 174 or sheet means 168 will not be damaged because of the resiliency thereof and the padding of the arms associated therewith. Such fruit falling thereon is fed downwardly and outwardly into the receiving means 106, 110, which allow the fruit to pass therethrough onto conveyors 84, 86, as previously described. Fruit falling directly on the receiving means 106, 110 is protected from damage by the resiliency of the longitudinal members 98, 108. The fruit falling on the receiving means 106, 110 falls through said receiving means and onto conveyors 84, 86 as previously described. Conveyors 84, 86 feed the fruit to sizing conveyor 88, 90, and onto lateral conveyors 92, 94, which in turn feed it into bin 96, where it is collected.

The arms 114, 116, 118, 122, 126 are curved or bowed in configuration, as shown in FIGS. 2 and 3. Because of such configuration, these arms are spaced from the taut sheet 132. Thus, fruit falling on the sheet 132 in the areas of the arms will not be bruised by these arms.

When substantially all of the fruit has been harvested from the tree 250, the shaking operation is stopped, the arms 222, 224 are opened, the sheet portions 128, 130 are retracted, and sheet portions 170, 172 are retracted. The overall width and length of the apparatus 30 are now much less, and the apparatus 30 may be easily and conveniently moved about the orchard to the next tree. To facilitate moving of the apparatus 30, arms 222, 224 may be raised by hydraulic cylinder 228. As previously described, forward portions 40A, 42A of sides 40, 42 may be raised or lowered by cylinder 76. To further facilitate moving of the apparatus 30, these forward portions 40A, 42A (and all structure carried thereby, including arms 112—126) may be raised to provide proper ground clearance, and lowered when the harvesting operation is about to begin.

It has been found that the shaker means 200 described herein is capable of effectively removing substantially all the fruit from a tree. The position adjustment features allow the shaker means 200 to be positioned for proper shaking and the weight adjustment feature ensures that proper force is applied to the tree, meanwhile ensuring that damage does not occur to the tree. It has also been found that, because of the great area covered by the bowllike sheet 132, substantially all of the fruit falling from the tree is received by the apparatus. Damage does not occur to the fruit during harvesting because of the resilient sheets and resilient longitudinal members which feed the fruit onto the conveyors. The retractability of the bowllike sheet 132, and the single-unit apparatus construction, along with the features of raisable and lowerable shaker means and forward frame portions, results in the apparatus being quite easy to handle as it is moved about the orchard. Finally, it should be noted that the overall apparatus is extremely simple and maintenance-free.

I claim:
1. A single-unit apparatus for harvesting fruit or the like from a tree comprising:
 a. a frame;
 b. a pair of generally parallel conveyors associated with the frame and disposed on either side of the trunk of the tree and extending beyond the trunk of the tree;
 c. first resilient sheet means associated with said frame sloping downwardly from the trunk of the tree on either side thereof to near the sides of the conveyors adjacent the trunk;
 d. second resilient sheet means associated with the frame and extending generally about the trunk from near the sides of the conveyors removed from the trunk in taut, generally bowllike configuration, both of said sheet means being configured to feed fruit falling thereon downwardly onto the conveyors said second resilient sheet means comprising a first sheet portion extending from near the side of one conveyor, and a second sheet portion extending from near the side of the other conveyor and overlapping to a small extent the first sheet portion to define said bowllike configuration of the second resilient sheet means with said first and second sheet portions each being extendable to positions together defining said bowllike configuration, and each being retractable to fold adjacent the conveyors near the sides thereof, and wherein are included means associated with said frame for selectively extending and retracting the first and second sheet portions; and e. shaker means associated with the frame and comprising a pair of arms positioned between the conveyors, means for providing a jawlike movement between the arms so that the tree may be gripped therebetween and means associated with the arms for shaking the tree when it is so gripped.

2. Apparatus according to claim 1 wherein are included means associated with the frame and said second resilient sheet means for resiliently suspending the inner edges of the second resilient sheet mean in spaced relation to the conveyors.

3. Apparatus according to claim 2 wherein the resilient suspending means comprise a plurality of taut, elastic members upwardly extending from the frame to the inner edges of the said resilient sheet means and positioned above the conveyors.

4. Apparatus according to claim 1 wherein are included first and second pluralities of resilient, longitudinal members, each plurality being associated with the frame in generally parallel spaced-apart and staggered relationship to define openings therebetween to allow fruit falling thereon to fall therethrough, meanwhile limiting the acceleration of the fruit falling therethrough, the first plurality of resilient, longitudinal members being positioned to receive fruit from both said sheet means and allow it to fall onto one of the pair of conveyors, the second plurality of resilient, longitudinal members being positioned to receive fruit from both said sheet means and allow it to fall therethrough onto the other of the pair of conveyors.

5. Apparatus according to claim 4 wherein each resilient, longitudinal member comprises a longitudinal tubular member and a longitudinal, elastic extensible member disposed through the tubular member from one end to the other.

6. Apparatus according to claim 1 wherein the means for selectively extending and retracting the first and second sheet portions comprise a first plurality of arms each pivotally mounted to the frame and fixed to the first sheet portion, each of the first plurality of arms being pivotal in one direction relative to the frame to extend the first sheet portion and in an opposite direction to retract the first sheet portion, a second plurality of arms each pivotally mounted to the frame and fixed to the second sheet portion, each of the second plurality of arms being pivotal in one direction relative to the frame to extend the second sheet portion, and in an opposite direction to retract the second sheet portion, and cable and cylinder means for pivoting the arms in one and the other directions.

7. Apparatus according to claim 6 wherein at least some of the arms are fixed only at their ends to the outer edge of the bowllike configured sheet means only, and are configured to be in spaced relation to the taut, bowllike configured sheet means.

8. Apparatus according to claim 1 wherein the means for shaking the trunk of the tree comprise a first eccentric weight rotatably fixed to one arm of said pair of arms, a second eccentric weight rotatably fixed to the other arm of said pair of arms, and hydraulic means for rotating the first and second eccentric weights at different rates of rotation.

9. Apparatus according to claim 8 wherein each eccentric weight comprises a plurality of removable and replaceable stacked plates.